United States Patent Office 3,558,567
Patented Jan. 26, 1971

3,558,567
PROCESS FOR THE PRODUCTION OF NYLON 6
Ian C. Twilley, Petersburg, David W. H. Roth, Jr., Chester, and Robert A. Lofquist, Richmond, Va., assignors to Allied Chemical Corporation, New York, N.Y., a corporation of New York
No Drawing. Filed Dec. 28, 1967, Ser. No. 694,044
Int. Cl. C08g 20/00
U.S. Cl. 260—78
8 Claims

ABSTRACT OF THE DISCLOSURE

Nylon-6 having a low cyclic oligomer content is produced by heating a mixture of epsilon-caprolactam and water (together with property-modifying additives and chain-terminating agents, if desired) to effect reaction of epsilon-caprolactam at a rate determined by the maximum concentration of cyclic oligomers desired in the product, a slower rate resulting in a lower cyclic oligomer content. When less than about 45% of the epsilon-caprolactam is reacted and the mixture has gone through a maximum end group concentration, the rate of polymerization can be increased and evaporative conditions can be applied to remove water and excess monomer without further increasing the concentration of cyclic oligomers.

BACKGROUND OF THE INVENTION

This invention relates to the production of polyamides. More particularly, it relates to the production of nylon-6 having a consistently narrow molecular weight range, a low concentration of non-polymeric constituents and whose end-groups can, at the same time, be selectively terminated. Nylon-6 made in this way can be melt-blended directly with other polymers without undesirable viscosity changes due to reaction of said other polymers with the nylon-6.

The melt-blending of nylon-6 with other polymers (e.g., polyesters) is becoming an increasingly attractive method for producing fibers with unusual and useful properties. Of crucial importance to the successful production of these so-called "polyblends" is the use of starting polymers of high purity. Specifically, polymers suitable for use in melt-blending operations must have minimal water, monomer, and oligomer content. The term "oligomers" as used herein means polyamide molecules having sufficiently low molecular weight that they can be extracted or leached out of the polymer proper with hot (usually boiling) water. Oligomers may be either linear or cyclic in character. It is especially desirable to limit the formation of cyclic oligomers because such species, unlike the linear variety, are unreactive under normal polymerization conditions and cannot easily be converted to high molecular weight linear polyamides.

When polyamides are to be used as components in a polyblend, it may also be desirable to block the terminal carboxyl or terminal amino groups to prevent reaction thereof with the other polymer component or components of the polyblend. Thus, in polyblending a polyamide with a polyester, it is usually necessary to "terminate" or "cap" the amino end-groups of the polyamide to prevent reaction thereof with the ester groups of the polyester.

Another desirable property of fiber-forming polymers in general and polyamides in particular, aside from any use thereof in polyblends, is a precise molecular weight, i.e., the molecular chain lengths in a given batch of polymer should vary only within narrow limits. Minimizing the monomer and oligomer content of the polyamide enhances this property. Efforts made toward achieving molecular uniformity in this way are usually rewarded by superior quality of the spun fiber.

It is known that polyamides suitable for melt-blending with polyesters are generally made by heating a mixture of an appropriate chain terminator (usually a dicarboxylic acid) and either (1) an amino acid, (2) a lactam, or (3) a diamine and a dicarboxylic acid. Polymerization and chain termination are driven to completion by prolonged heating of the reaction mixture in vacuo and/or heating and contacting the reaction mixture with an inert gas at a high sweep rate. Low molecular weight constituents (i.e., water and monomer) are to a large extent removed during this step. The removal of virtually all the water and monomer in this manner is not difficult to achieve; vacua of 5–10 mm. Hg Abs. will generally suffice. However, the removal of the oligomers from the viscous polymer melt is more difficult, since they have extremely low vapor pressures; prolonged heating under high vacua (i.e., pressures less than 1 mm. Hg) and/or contact with a rapidly flowing evaporative atmosphere are generally required to effectively remove them. Subjecting the polymer to such extreme heating conditions heightens the risk of damage to the product through thermal decomposition and the like. Furthermore, processing problems are encountered because of sublimation of the oligomers in the vapor lines and plugging of a condenser system.

To avoid the problems encountered in removing oligomers in an evaporative atmosphere or in vacuo, it has been proposed to substitute therefor the added (and expensive) steps of:

(1) thoroughly washing the polyamide with hot water to leach out the oligomers; and
(2) subsequent drying of the polyamide to a very low moisture level before spinning or melt-blending.

Furthermore, to provide an economical process, short reaction times are desirable in order to minimize processing costs for a given plant capacity. This is generally achieved by utilization of suitable catalytic entities, elevated temperatures and efficient removal of condensation products (i.e. water). However, processes which achieve rapid polymerization generally yield products containing appreciable amounts of cyclic oligomers. Hence, the benefits derived from shorter reaction times tend to be offset by increased difficulty in removing such oligomers from the polyamide product.

It is therefore an object of the present invention to provide a process for producing nylon-6 which is low in cyclic oligomer content. Another object of the invention is to provide a process for producing, in relatively short reaction time, nylon-6 which is low in cyclic oligomer content.

These and other objects as well as a fuller understanding of the present invention can be had by referring to the following detailed description and claims.

According to the present invention, nylon-6 having, ab initio, a low oligomer content is produced by reacting a mixture comprising epsilon-caprolactam, water, and chain terminator (optional) at such a rate that no more than about 45% of the monomer has reacted, and the mixture goes through a maximum end group formation, after which time substantially more vigorous hydrolysis and polymerization conditions can be imposed to hasten the completion of the process. The present invention is based upon the discovery that cyclic oligomers are not formed to any significant extent after the reacting system has achieved maximum end-group formation, as determined by titration of total amine and carboxyl groups. It has been discovered that this situation may be reached under certain conditions when approximately 45% of the lactam has reacted. It has also been discovered that the amount of cyclic oligomers produced decreases with increasing time required for 45% consumption of the monomer. That is, the greater the rate of reaction of the lactam-water-terminator (if any) mixture during the consumption of about the first 45% of the lactam, the greater the rate of formation of cyclic oligomers. Conversely, the total amount of cyclic oligomers formed decreases as said rate decreases.

Now, it is generally considered that nylon-6 containing no more than about 2% by weight of oligomers is suitable for melt-blending and spinning operations; fiber produced therefrom is generally considered suitable for most uses. Accordingly, it is a feature of the present invention that nylon-6 containing no more than, and preferably less than about 2% by weight oligomers can be produced in accordance with the present process by conducting the polymerization of epsilon-caprolactam in the presence of water, additives, and a chain terminator (if desired) at an initial rate such that no more than about 45% by weight of the epsilon-caprolactam charged has reacted at the end of about 1 hour. The hydrolysis is then continued until the mixture passes through a maximum end group to form a hydrolysate, which is a non-volatile material consisting of amino caproic acid and very low molecular weight condensation products, after which time the rate of hydrolysis and polymerization can be increased in order to minimize the overall time required for complete hydrolysis and polymerization, which rate increase will not result in further significant production of cyclic oligomers. Suitable techniques for increasing the rate of polymerization include use of elevated temperature, removal of unreacted monomer, use of catalysts, and other known expedients.

During the initial or hydrolysate-forming stage of the process of the present invention, chain terminators and various other additives can be included in the reaction system. In this way, either the terminal amino groups or the terminal carboxyl groups of the polyamide chain can be terminated or "capped." Thus, the terminal carboxyl groups can be terminated by including in the initial reaction mixture either a monoamine or a diamine of at least 6 carbon atoms, with aralkyl mono- and diamines being preferred. Illustrative of the amines suitable for use in the present invention are meta-xylylene diamine, benzylamine, 4,4'-diaminomethylbiphenyl, beta-aminomethylnaphthalene, 1,5-diaminomethylnaphthalene, and the like.

For the melt-blending of nylon-6 with polyesters, however, it is usually desired to block the terminal amino groups of the polyamide chain to prevent reaction thereof with the ester groups of the polyester during melt-blending and subsequent spinning steps. Substances useful for capping the terminal amino groups of polyamides of the present invention are of the type described in U.S. patent application No. 426,632 of Ian C. Twilley filed Jan. 19, 1965, now U.S. Pat. No. 3,386,967, granted June 4, 1968. Such chain terminators include, aliphatic, alicyclic, aromatic, and heterochain dicarboxylic acids having at least 6 carbon atoms per molecule, and preferably between 6 and about 20 carbon atoms per molecule. Examples of dicarboxylic acids suitable for use in this invention are:

(1) Aliphatic dicarboxylic acids

Adipic acid
Hexa-3-enedioic acid
Pimelic acid
Suberic acid
Azelaic acid
Sebacic acid
Undecanedioic acid
Dodecanedioic acid
Tetradecanedioic acid (2) Alicyclic dicarboxylic acids Cyclohexane-1,4-dicarboxylic acid
Cyclohexa-2,5-diene-1,4-dicarboxylic acid
Decalin-2,6-dicarboxylic acid
Bicyclohexyl-4-4'-dicarboxylic acid (3) Aromatic dicarboxylic acids Terephthalic acid
Naphthalene-1,5-dicarboxylic acid (4) Heterochain dicarboxylic acids Ethylene glycol-bis-carboxymethyl ether Aliphatic monocarboxylic acids of at least 2 carbon atoms (e.g., acetic acid, propionic acid, and the like) can also be employed as terminating agents, although they are less preferable than the dicarboxylic acids described above. The chain terminators can also contain substituent groups provided such groups do not react with the amino or carboxyl groups in the course of the polymerization reaction or hinder the reactivity of the dicarboxylic acid toward the amino end-groups of the polyamide. Examples of such substituents include lower alkyl groups, ether groups, and the like. Also, the dicarboxylic acid must be thermally stable, non-volatile under polymerization conditions. Similarly reactive derivatives of dicarboxylic acids, e.g., monoesters, diesters, dibasic acid anhydrides, and the like, are also suitable for terminating amino endgroups of the polyamides of the present invention.

Dicarboxylic acid terminating agents suitable for use in the present invention are preferably used in amounts of between about 0.1 and about 0.7 mole per 100 moles of epsilon-caprolactam and preferably between about 0.2 and about 0.4 mole per 100 moles of epsilon-caprolactam. The amount of dicarboxylic acid employed determines to a large extent the molecular weight of the polyamide and the proportion of end-groups. Thus, as disclosed in the above-cited Twilley application, the use of about 0.1 mole of dicarboxylic acid per 100 moles of epsilon-caprolactam generally results in a polyamide having an average molecular weight of about 15,000 and containing about 20 milliequivalents of amino end-groups per kilogram of polymer (abbreviated hereinafter as meq./kg.). The use of a dicarboxylic acid within the preferred range of between about 0.2 mole and about 0.4 mole per 100 moles of epsilon-caprolactam will afford a polyamide having an average molecular weight between about 25,000 and about 40,000, which corresponds to a formic acid relative viscosity of about 60 to 90 units. Such a polyamide will contain less than about 10 meq./kg. of primary amino groups, which is satisfactory for melt-blending operations with polyesters.

In addition to chain-terminating agents, other property-modifying ingredients may be added to the reaction mixtuer in any desired amount. Examples of such additives include fire-retarding agents (e.g., antimony, phosphorous, and halogen compounds), delustrants (e.g., titanium dioxide), antistatic agents, adhesion promoting agents (e.g., isocyanates, and epoxides), heat and light stabilizers (e.g., inorganic reducing ions); transition metal ions (e.g., $Mn^{+2}$, $Cu^{+2}$, $Sn^{+2}$); phosphites, organic amines (e.g., alkylated aromatic amines and ketone-aromatic amine condensates), thermally stable pigments, fluorescing agents and brighteners, latent cross-linking agents, bacteriostats (e.g., phenols and quaternary amines); colloidal reinforcing particles, anti-soiling agents, and the like. These additives can be incorporated into the polymer at any stage of the reaction, whether as concentrates distributed in the monomer or in preformed polyamide, or as pure ingredients. From the standpoint of operational efficiency, however, the additives are preferably introduced together with chain-terminating agent at the commencement of the process. Proper dispersion of these ingredients within the polymer are achieved by means conventional in the melt-spinning art.

According to the present invention, the rate of polymerization of epsilon-caprolactam in a system initially comprising the monomer, water, and additives (which can include chain terminators) depends upon the concentrations of epsilon-caprolactam, water, and chain terminator (if any), as well as temperature. Thus, an especially preferred nylon-6, i.e., which contains no more than about 2% by weight of cyclic oligomers, and which may be either unterminated or terminated with monocarboxylic acids or dicarboxylic acids, is produced in accordance with the present invention by adjusting the aforementioned factors so that the following quantitative relationship 1 is satisfied:

$$1 > \left( \frac{\int_{t=0}^{t=1} \dot{M} dt}{M_0} \right) \geq 0.55 \tag{1}$$

wherein:

$t$ = time (hours)

$M_0$ = concentration (moles/liter) of epsilon-caprolactam at $t=0$.

$\dot{M}$ = rate of disappearance of epsilon-caprolactam (moles/liter per hour)

It is a feature of the present invention that the value of $\dot{M}$ is determined by the following expression 2:

$$\dot{M} = [P + aS + 0.0026] \left[ k_a{}^e \left( \frac{P}{K_a} - MP \right) - k_o{}^e M w \right] \tag{2}$$

and $$\dot{w} = [\dot{P}] = [P + aS + 0.0026][k_o{}^e M w]$$
$$- k_o \left[ P(P + aS) - \frac{w(M_0 - M - P)}{K_c} \right] \tag{3}$$

wherein:

$k_c$ = polycondensation rate constant (liters/mole/hour)

$$= 8.948 \times 10^5 \exp \left[ \frac{-5907}{T} \right]$$

$k_a{}^e$ = polyaddition rate constant (liter/mole/hour)

$$= 2.914 \times 10^9 \exp \left[ \frac{-7846}{T} \right]$$

$k_o{}^e$ = monomer hydrolysis rate constant (liters/mole/hour)

$$= 2.011 \times 10^9 \exp \left[ \frac{-11,000}{T} \right];$$

$K_c$ = polycondensation equilibrium constant (liters/mole)

$$= 0.519 \exp \left[ \frac{3.595}{T} \right];$$

$K_a$ = polyaddition equilibrium constant (liters/mole)

$$= 1.398 \times 10^{-2} \exp \left[ \frac{2.435}{T} \right];$$

T = absolute temperature (° K.);
M = concentration (moles/liter) of epsilon-caprolactam at time $t$;
w = concentration (moles/liter) of water at time $t$;
$\dot{w}$ = rate of disappearance of water (moles/liter per hour);
P = concentration (moles/liter) of amino end-group;
$\dot{P}$ = rate of appearance of amino end-groups (moles/liter per hour);
S = concentration (moles/liter) of chain terminator; and
$a$ = number of carboxyl groups per molecule of terminator (e.g. for sebacic acid, $a=2$; for acetic acid, $a=1$)

The procedures for manipulating the above relationships to obtain reaction conditions in accordance with the present invention are preferably conducted by mechanical means and will be obvious to those skilled in the computational arts.

In preferred embodiments of the invention it is preferred to start with epsilon-caprolactam containing between about 0.2% and about 1.5% by weight water and to conduct the reaction at a temperature of between about 225° C. and about 280° C., which conditions will satisfy quantitative expression 1.

After maximum end-group formation has been attained according to the process of the present invention, the temperature of the reaction mixture can be rapidly increased (preferably with retention of water in the system) to a temperature preferably between about 250° C. and about 300° C. Under these conditions, the remaining epsilon-caprolactam is rapidly consumed until about the equilibrium monomers concentration is reached. The equilibrium monomer concentration level is dependent on the reaction temperature, water content and whether it is a continuous process with back mixing or plug flow, or a batch process. This stage of the process is termed the "chain-lengthening step"; the product thereof is termed a "prepolymer" because of its relatively low viscosity compared to that of the final product.

In this manner, the overall time needed for complete conversion of epsilon-caprolactam to polyamide is greatly reduced without the concomitant increase in oligomer content previously encountered.

In the following examples which are illustrative of the process of the present invention:

Parts and percentages are by weight and pressures are expressed in absolute units unless otherwise indicated.

Viscosity measurements are expressed in terms of F.A.R.V. units, i.e., the Standard Formic Acid Relative Viscosities as described in ASTM D–789–62T for the crude (i.e., unwashed) polymer.

The numbers of milliequivalents of amino end-groups and carboxyl end-groups per kilogram of polymer are determined by chemical analysis. Thus, amino end-groups are analysed by dissolving a weighed polymer sample in m-cresol and titrating with a methanolic solution of p-toluenesulfonic acid to the thymol blue end-point. Likewise, carboxyl end-groups are analysed by dissolving a weighed polymer sample in benzyl alcohol and titrating with a solution of sodium hydroxide in benzyl alcohol to the phenolphthalein end-point.

EXAMPLE 1

To a melt tank is charged a mixture of 0.75% sebacic acid, 0.014% cupric acetate dihydrate, 0.7% water, and 98.5% epsilon-caprolactam. The molten mixture at a temperature of 90° C. is pumped continuously through a preheater, which heats the charge to the operating temperature, to a conventional, sealable, hyrolysis and polymerization apparatus (hereinafter called "the reactor"). The reaction temperature is maintained at about 254° C., and the operating pressure is controlled at about 16 p.s.i.g. The flow rate to and from the reactor is adjusted so that the average residence time within the reactor is about 1–2 hours.

The material withdrawn from the reactor has the following analysis. Hot water extractables (i.e. monomer and oligomers) 52%, amino end-groups 90 meq./kg., carboxyl end groups 165 meq./kg.

The molten hydrolysate is then pumped to a polyaddition reactor. The temperature of the hydrolysate within the polyaddition reactor is 290° C., pressure generated is essentially autogenous and the average residence time of the reaction melt therein is about 1 hour. At the completion of this stage of the process, the prepolymer analyzed as follows:

Monomer content 12%, cyclic oligomer content 1.9%, amino end groups 42 meq./kg., carboxyl end groups 115 meq./kg.

The above prepolymer is pumped to a flasher through a die plate where the pressure is reduced to 50 mm. Hg absolute pressure. In this reactor most of the free water and some monomer are removed. The residence time in this reactor is about 10 minutes.

From the flasher, the polymer melt is continuously transferred to a single screw horizontal reactor called a finisher operating at a temperature of about 280° C. under a vacuum of about 5 mm. Hg Abs. pressure. The average time of the material within the finisher is about 120 minutes, after which time the polymer has the following properties: FARV 52, cyclic oligomer content 1.7%, monomer content less than 0.1%, amino end groups 10 meq./kg., carboxyl end groups 83 meq./kg. Nylon-6 polymer having the above properties is suitable for direct spinning or melt blending without further processing.

EXAMPLES II–VII

In the following Examples II–VII, the procedure of Example I is repeated except that the conditions of water content, terminators, and temperature and varied so as to achieve the conditions prescribed by the present invention. In each of Examples VI–VII, the conditions are such that more than 45% caprolactam is reacted at the end of about one hour with the result that the oligomer content of the final product of each of these two runs exceeds the desired maximum of 2 percent. The conditions employed in Examples II–VII are summarized in Table A below.

weight of the epsilon-caprolactam is reacted at the end of about 1 hour and the mixture goes through maximum end group formation concentration to form a composition containing hydrolysate, and (b) heating said hydrolysate, at a temperature between about 250° and 300° C., but higher than the temperature for said step (a), at elevated pressure in the presence of water until the hydrolysate is converted into a composition containing prepolymer and having equilibrium monomer concentration, so that the poly-epsilon-caprolactam contains less than about 2% cyclic oligomer.

2. The process of claim 1 wherein the elevated pressure in step (a) is autogenous pressure.

3. The process according to claim 1 wherein the mixture in step (a) additionally includes a chain-terminator.

TABLE A

| Example: | Initial water content percent | Sebacic acid content (moles/kg.) | Reaction temp. (° C.) | Time (in hours) required to reach 45% conversion | Carboxyl end-group concentration (meq./kg.)ᵃ | Oligomer content in final product (percent) |
|---|---|---|---|---|---|---|
| II | 0.2 | 0.00 | 280 | 3.5 | 150 | 1.3 |
| III | 0.5 | 0.00 | 245 | 5.0 | 160 | 1.3 |
| IV | 0.7 | 0.06 | 235 | 2.0 | 160 | 1.6 |
| V | 0.7 | 0.06 | 220 | 2.5 | 140 | 1.5 |
| VI | 1.5 | 0.00 | 280 | 0.5 | 250 | 3.5 |
| VII | 3.0 | 0.027 | 250 | 0.3 | 400 | 3.2 |

ᵃ These values are determined for material emerging from the reactor.

The foregoing examples are presented for the purpose of illustration without limiting the purview of the present invention. It is to be understood that the novel features of the present invention can be adapted to either batchwise or continuous process; variations in the temperatures, reaction times, flow rates, pressures, proportions of reagents, apparatus, and the like can be made within the limits set forth earlier in this specification without departing from the scope of the present invention as set forth in the following claims.

We claim:

1. In a process for preparing poly-epsilon-caprolactam by first heating epsilon-caprolactam and water under pressure at a temperature between 225° and 300° C. to form a prepolymer then reducing pressure on said prepolymer and again heating said prepolymer while removing volatile products therefrom until a polymer of desired viscosity is obtained, the improvement which comprises
conducting said first heating in two steps comprising, consecutively,
(a) heating said epsilon-caprolactam containing between about 0.2 and 1.5 by weight water at elevated pressure and at a temperature between about 225° and 280° C., said temperature selected such that less than about 45% by 4. The process of 3 wherein said terminator is difunctional with respect to an amide forming reaction.

5. The process according to claim 4 wherein the terminator is dicarboxylic acid of at least 6 carbon atoms selected from the group consisting of aliphatic, alicyclic, aromatic, and heterochain dicarboxylic acids.

6. The process according to claim 5 wherein the chain terminator is sebacic acid.

7. The process according to claim 3 wherein the chain terminator is used in an amount between about 0.1 mole and about 0.7 mole per 100 moles of epsilon-caprolactam.

8. The process of claim 1 wherein step (a) takes place within 1 to 3 hours.

References Cited

UNITED STATES PATENTS

| 2,241,322 | 5/1941 | Hanford | 260—78L |
| 3,171,829 | 3/1965 | Wiesner et al. | 260—78L |
| 3,245,964 | 4/1966 | Wiesner et al. | 260—78L |
| 3,335,115 | 8/1967 | Ludewig | 260—78L |
| 3,361,721 | 1/1968 | Markel et al. | 260—78L |

HAROLD D. ANDERSON, Primary Examiner

L. M. PHYNES, Assistant Examiner